US011592425B2

United States Patent
Oikawa et al.

(10) Patent No.: US 11,592,425 B2
(45) Date of Patent: Feb. 28, 2023

(54) CLEANING METHOD OF FIELD-FLOW-FRACTIONATION APPARATUS

(71) Applicant: Shimadzu Corporation, Kyoto (JP)

(72) Inventors: Yukio Oikawa, Kyoto (JP); Shigeyoshi Horiike, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 460 days.

(21) Appl. No.: 16/776,654

(22) Filed: Jan. 30, 2020

(65) Prior Publication Data

US 2020/0249208 A1 Aug. 6, 2020

(30) Foreign Application Priority Data

Feb. 4, 2019 (JP) .............................. JP2019-017700

(51) Int. Cl.
*G01N 30/00* (2006.01)
*B01D 65/02* (2006.01)
*B01D 63/00* (2006.01)
*B03B 5/62* (2006.01)

(52) U.S. Cl.
CPC ........... *G01N 30/0005* (2013.01); *B03B 5/62* (2013.01); *G01N 2030/0025* (2013.01)

(58) Field of Classification Search
CPC .. G01N 30/0005; B01D 65/02; B01D 63/005; B01D 63/088; B03B 5/62
USPC ........................ 422/68.1; 436/52, 177–178
See application file for complete search history.

(56) References Cited

U.S. PATENT DOCUMENTS

| | | | | |
|---|---|---|---|---|
| 4,147,621 A * | 4/1979 | Giddings | ............. | B01D 61/246 210/321.75 |
| 5,221,479 A * | 6/1993 | Etoh | ................... | B01D 65/02 210/636 |
| 6,109,119 A * | 8/2000 | Jiang | .................. | G01N 30/0005 73/864.33 |
| 6,365,050 B1 * | 4/2002 | Cauchon | ............ | G01N 30/0005 210/800 |
| 2004/0000519 A1 * | 1/2004 | Jiang | .................. | G01N 30/0005 210/656 |

(Continued)

FOREIGN PATENT DOCUMENTS

| | | |
|---|---|---|
| CN | 109153022 A | 1/2019 |
| JP | 2008-000724 A | 1/2008 |

(Continued)

OTHER PUBLICATIONS

Arfvidsson, C. et al, Analytical Biochemistry 2003, 313, 76-85.*

(Continued)

*Primary Examiner* — Arlen Soderquist
(74) *Attorney, Agent, or Firm* — Muir Patent Law, PLLC

(57) ABSTRACT

Provided is a field-flow-fractionation apparatus that is configured to supply a carrier fluid to a waste fluid chamber through a fluid supply flow path at a flow rate higher than a set flow rate of a flow rate adjusting part at a timing between an end of analysis of a sample and a start of analysis of a subsequent sample, thereby forming a flow of the carrier fluid from the waste fluid chamber to the separation channel. Accordingly, the sample adhering to a separation membrane is separated from the separation membrane and is discharged from the outlet port.

13 Claims, 3 Drawing Sheets

(56) References Cited

U.S. PATENT DOCUMENTS

2008/0003689 A1* 1/2008 Lee .................. G01N 30/0005
436/174
2011/0253535 A1* 10/2011 Moon .............. G01N 27/44773
204/627

FOREIGN PATENT DOCUMENTS

JP            2008200566 A     9/2008
JP            2008-200566    *  9/2009

OTHER PUBLICATIONS van de Ven, W. J. C. et al, Journal of Membrane Science 2008, 308, 218-229.*
Shang, R. et al, Separation and Purification Technology 2015, 147, 303-310.*
Litzen, A. et al, Journal of Chromatography 1991, 548, 393-406.*
Litzen, A. et al, Analytical Biochemistry 1993, 212, 469-480.*
Redkar, S. G. et al, AIChE Journal 1995, 41, 501-508.*
Reschiglian, P. et al, Ananlytical Chemistry 2000, 72, 5945-5954.*
Mores, W. D. et al, Journal of Membrane Science 2001, 189, 217-230.*
van Bruijnsvoort, M. et al, Journal of Chromatography A 2001, 925, 171-182.*
Wahlund, K.-G. et al, Ananlytical Chemistry 2002, 74, 5621-5628.*
van de Ven, W. et al, Journal of Membrane Science 2009, 338, 67-74.*
Gueguen, C. et al, Journal of Chromatography A 2011, 1218, 4188-4198.*
Shi, X. et al, Journal of Water Process Engineering 2014, 1, 121-138.*
First Office Action from the Chinese Intellectual Property Office for corresponding application No. CN 201911097067.0 dated Oct. 14, 2021.
He Xiaowen, "Water Pollution Treatment, New Technology and Application", Journal of University of Science and Technology of China, pp. 228-229, (2013), submitted with a machine translation.
Second Office Action from the Chinese Patent Office dated Apr. 22, 2022 for corresponding Chinese Patent Application No. CN 201911097067.0, submitted with a machine translation.

* cited by examiner

CLEANING METHOD OF FIELD-FLOW-FRACTIONATION APPARATUS

BACKGROUND OF THE INVENTION

1. Field of the Invention

The present invention relates to a field-flow-fractionation apparatus for separating and fractionating fine particles contained in a fluid using field-flow-fractionation, and a cleaning method of the field-flow-fractionation apparatus.

2. Description of the Related Art

Known examples of a method for separating and detecting, or fractionating fine particles each having a particle diameter within a wide range of about from 1 nm to 50 µm dispersed in a solution include a so-called field-flow-fractionation of a crossflow type (e.g., refer to Japanese Unexamined Patent Publication No. 2008-000724).

SUMMARY OF THE INVENTION

To specifically describe an object of the present invention, a structure of a field-flow-fractionation apparatus of a crossflow type, employing an asymmetric channel structure, will be described. The apparatus includes a separation channel for separating samples. One of the wall surfaces forming the separation channel is a semipermeable membrane with pores (referred to also as a separation membrane) such as regenerated cellulose (RC) or polyethersulfone (PES), and a porous flat plate called a frit is further provided outside the semipermeable membrane. When a carrier fluid introduced into the channel passes through the wall surface, a flow (cross flow) in a direction perpendicular to a forward flow (channel flow) flowing from an inlet port to an outlet port of the separation channel is generated. Hereinafter, a wall surface side where the frit is provided in the separation channel is defined as a lower side.

In the separation channel, a flow (focus flow) opposite to the channel flow is formed as necessary. The carrier fluid having passed through the separation membrane forming the wall surface of the separation channel is discharged from an outlet port (discharge port) different from the outlet port of the separation channel. The amount of discharge from the frit is controlled by a mass flow controller (MFC) provided on a discharge port side.

A sample is introduced into the separation channel from the inlet port using a sample injector. At this time, in the separation channel, a channel flow caused by the carrier fluid supplied from the inlet port and an opposite flow (focus flow) caused by the carrier fluid supplied from a port on an outlet port side, different from the inlet port, are formed. Then, the samples introduced into the separation channel are collected in a boundary portion between the channel flow and the focus flow. This is called focusing.

The sample particles collected in the boundary portion of the opposite flow due to focusing have differences in diffusion coefficient caused by differences in hydrodynamic radius, so that particles to be more easily diffused are collected on an upper side of the separation channel. This is called relaxation. After that, when the focus flow is stopped and the flow in the separation channel includes only the channel flow and the cross flow, the sample particles are discharged in the order of size from the separation channel through the outlet port due to a stokes flow. The outlet port of the separation channel is connected to a detector such as an ultraviolet absorbance detector. For example, a fractogram is obtained by measuring absorbance of the sample particles in the order of value of absorbance, from low to high, in the ultraviolet region (190 nm to 280 nm).

The field-flow-fractionation apparatus of a crossflow type as described above may cause a part of the sample to be trapped in the pores of the separation membrane and remain in the separation channel even after analysis is completed. The sample trapped in the separation membrane is less likely to be removed from the separation channel even when the carrier fluid continues to flow in the separation channel. Thus, it may take a long time to remove the sample remaining in the separation channel. Analyzing a next sample with the sample remaining in the separation channel causes problems such as contamination of a new sample due to the sample remaining in the separation channel.

Thus, an object of the present invention is to enable a sample remaining in a separation channel to be efficiently removed after analysis is completed.

A field-flow-fractionation apparatus according to the present invention includes a separation channel, a separation membrane, a waste fluid chamber, a flow rate adjusting part, a fluid supply flow path, a fluid supply part, and a control part. The separation channel has one end provided with an inlet port and the other end provided with an outlet port, and forms a space through which a carrier fluid supplied through the inlet port flows. The separation membrane is interposed between the separation channel and the waste fluid chamber, and has properties of allowing no sample particle to pass while allowing the carrier fluid to pass. The waste fluid chamber forms a space through which the carrier fluid having passed through the separation membrane flows, and has a discharge port through which the carrier fluid is discharged to the outside. The flow rate adjusting part is connected to the discharge port to adjust a flow rate of the carrier fluid to be discharged from the waste fluid chamber through the discharge port to a flow rate of a setting for the flow rate adjusting part. The fluid supply flow path is connected to a portion between the waste fluid chamber and the flow rate adjusting part to supply a carrier fluid to the waste fluid chamber without through the separation channel. The fluid supply part supplies a carrier fluid to the waste fluid chamber through the fluid supply flow path. The control part is configured to control the fluid supply part and the flow rate control part to cause the field-flow-fractionation apparatus to perform a cleaning operation, and is configured to control the fluid supply part and the flow rate adjusting part to supply the carrier fluid to the waste fluid chamber through the fluid supply flow path at a flow rate higher than the flow rate of the setting for the flow rate adjusting part until analysis of a subsequent sample is started after analysis of a sample is completed. Supplying the carrier fluid to the waste fluid chamber at a flow rate higher than the flow rate of the setting for the flow rate adjusting part causes the carrier fluid to flow backward from the waste fluid chamber toward the separation channel. That is, the control part has functions of forming a flow of a carrier fluid from the waste chamber to the separation channel, and performing cleaning operation for separating a sample adhering to the separation membrane from the separation membrane and discharging the sample from the outlet port.

The control part may be configured to set the setting for the flow rate adjusting part to zero in the cleaning operation. This reduces a flow rate of a carrier fluid to be supplied to the waste fluid chamber through the fluid supply flow path during the cleaning operation, so that consumption of the carrier fluid can be suppressed.

The control part may be configured to perform the cleaning operation in a state where a carrier fluid is supplied into the separation channel through the inlet-port flow path. This configuration enables a sample separated from the separation membrane to be efficiently introduced to the outlet port and discharged using a flow of the carrier fluid from the waste fluid chamber to the separation channel.

The field-flow-fractionation apparatus according to the present invention may include a focus-flow fluid supply flow path that is connected to the separation channel at a carrier fluid supply position different from the inlet port to supply a carrier fluid to the separation channel so that a flow of a carrier fluid opposite to a flow of a carrier fluid from the inlet port is formed. This case enables that a fluid feed pump for supplying a carrier fluid to the separation channel through the focus-flow fluid supply flow path and a fluid feed pump for supplying a carrier fluid to the waste fluid chamber through the fluid supply flow path are realized by common pump. That is, the fluid supply part may include a fluid supply pump which supplies the carrier fluid and is connected, via a switching valve, to the focus-flow fluid supply flow path and the fluid supply flow path, the fluid supply part is configured to select either the focus-flow fluid supply flow path or the fluid supply flow path as a channel for supplying the carrier fluid by switching the switching valve.

In addition, a fluid feed pump for supplying a carrier fluid to the inlet port of the separation channel and a fluid feed pump for supplying a carrier fluid to the waste fluid chamber through the fluid supply flow path may be realized by common pump. That is, the fluid supply part may include a fluid supply pump which supplies the carrier fluid and is connected, via a switching valve, to an inlet flow path and the fluid supply flow path. The inlet flow path leads to the inlet port of the separation channel. The fluid supply part is configured to select either the inlet-port flow path or the fluid supply flow path as a channel for supplying the carrier fluid by switching the switching valve.

A cleaning method according to the present invention is for cleaning the separation channel of the field-flow-fractionation apparatus. The field-flow-fractionation apparatus includes the separation channel, the separation membrane, the waste fluid chamber, the flow rate adjusting part, the fluid supply flow path, and the fluid supply part. The cleaning method includes a cleaning step of separating a sample adhering to the separation membrane from the separation membrane and discharging the sample from the outlet port by supplying a carrier fluid to the waste fluid chamber through the fluid supply flow path at a flow rate more than the flow rate of the setting for the flow rate adjusting part after an analysis of the sample is completed.

In the cleaning step, the setting for the flow rate adjusting part may be set to zero. This reduces a flow rate of a carrier fluid to be supplied to the waste fluid chamber through the fluid supply flow path in the cleaning step, so that consumption of the carrier fluid can be suppressed.

The cleaning step may be performed in a state where a carrier fluid flows in the separation channel. This enables a sample separated from the separation membrane to be efficiently discharged from the separation channel using a flow of the carrier fluid from the waste fluid chamber to the separation channel.

The field-flow-fractionation apparatus according to the present invention is configured to supply a carrier fluid to the waste fluid chamber at a flow rate more than the flow rate of the setting for the flow rate adjusting part until analysis of a subsequent sample is started after analysis of a sample is completed, thereby forming a flow of the carrier fluid from the waste fluid chamber to the separation channel, so that the sample adhering to the separation membrane can be separated from the separation membrane and discharged from the outlet port. This enables the sample remaining in the separation channel to be efficiently removed.

The cleaning method according to the present invention is performed to supply a carrier fluid to the waste fluid chamber through the fluid supply flow path at a flow rate more than the flow rate of the setting for the flow rate adjusting part after analysis of the sample is completed, thereby forming a flow of the carrier fluid from the waste fluid chamber to the separation channel, so that the sample adhering to the separation membrane can be separated from the separation membrane and discharged from the outlet port. This enables the sample remaining in the separation channel to be efficiently removed.

DETAILED DESCRIPTION OF THE INVENTION

Figure 1:
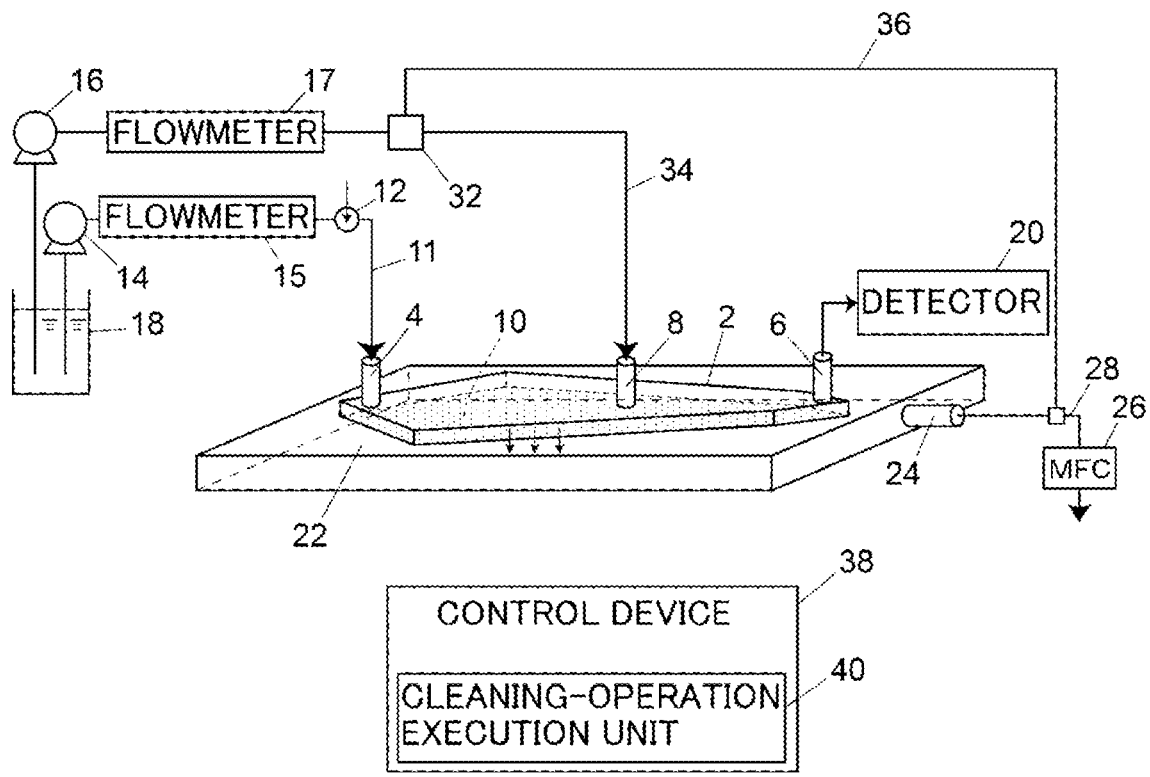
FIG. 1 is a schematic flow path configuration diagram schematically illustrating an example of a field-flow-fractionation apparatus.

Hereinafter, embodiments of a field-flow-fractionation apparatus and a cleaning method will be described with reference to the drawings.

An example of the field-flow-fractionation apparatus will be described with reference to FIG. 1.

The field-flow-fractionation apparatus of the present example includes a separation channel 2 for separating sample particles, and the separation channel 2 communicates with an inlet port 4, an outlet port 6, and an intermediate port 8. The inlet port 4 communicates with one end of the separation channel 2, and the outlet port 6 communicates with the other end of the separation channel 2. The intermediate port 8 is positioned between the inlet port 4 and the outlet port 6. Although not illustrated, the separation channel 2 is formed inside a block formed by layering a plurality of base plates, for example, and each of the ports 4, 6 and 8 is formed of a hole provided in the block.

The separation channel 2 has a substantial diamond shape. The one end and the other end of the separation channel 2 are each an angled portion. The separation channel 2 has a width dimension in its planar shape, increasing once from the one end toward the other end, and decreasing from the middle toward the other end to converge at the other end.

The inlet port 4 is connected to an inlet-port flow path 11 communicating with a container 18 that stores a carrier fluid. The inlet-port flow path 11 is provided with a fluid feed pump 14 for feeding a carrier fluid stored in the container 18, a flowmeter 15, and a sample injection part 12. Sample particles to be separated are injected through the sample injection part 12 and introduced into the separation channel 2 from the inlet port 4 together with a carrier fluid fed by the fluid feeding pump 14. The outlet port 6 communicates with a detector 20.

In the separation channel 2, a flow of a fluid flowing from the inlet port 4 toward the outlet port 6 is referred to as a "channel flow". One wall surface (lower wall surface in the drawing) of the separation channel 2, parallel to the channel flow, is formed of a separation membrane 10 having properties allowing a carrier fluid to pass and allowing no sample particle to pass. The separation membrane may be a semipermeable membrane having pores, such as regenerated cellulose (RC) or polyethersulfone (PES). Some carrier fluid introduced into the separation channel 2 pass through the separation membrane 10, so that a flow in a direction indicated by the arrow in the drawing, i.e., in a direction orthogonal to the channel flow, is generated in the separation channel 2. This flow is referred to as a "cross flow".

The carrier fluid having passed through the separation membrane 10 flows through a waste fluid chamber 22 provided below the separation channel 2 and is discharged to the outside through a discharge port 24. The discharge port 24 is connected to a discharge flow path 28 in which a mass-flow controller (MFC) 26 is provided as a flow rate adjusting part. The MFC 26 controls a flow rate of a carrier fluid to be discharged from the waste fluid chamber 22.

The intermediate port 8 is connected to a focus-flow fluid supply flow path 34 communicating with the container 18, separately from the inlet-port flow path 11. The focus-flow fluid supply flow path 34 is provided with a fluid feed pump 16 for feeding a carrier fluid from the container 18, a flowmeter 17, and a switching valve 32. The fluid feed pump 16 is provided independently of the fluid feed pump 14 that supplies a carrier fluid to the inlet port 4. The fluid feed pump 16 supplies a carrier fluid at a predetermined flow rate from the intermediate port 8 into the separation channel 2 as necessary to form a focus flow opposite to the channel flow in the separation channel 2.

The switching valve 32 in the focus-flow fluid supply flow path 34 is connected to a fluid supply flow path 36. The fluid supply flow path 36 communicates with the discharge flow path 28 between the discharge port 24 and the MFC 26. The switching valve 32 is configured to selectively switch a supply path of a carrier fluid fed by the fluid feed pump 16 between the focus-flow fluid supply flow path 34 and the fluid supply flow path 36.

Operation of the field-flow-fractionation apparatus is controlled by a control device 38 (control part). The control device 38 is fabricated by an electronic circuit on which an arithmetic element and the like is mounted. The control device 38 includes a cleaning-operation execution part 40. The cleaning operation execution part 40 is a function obtained by executing a program in the electronic circuit.

The cleaning-operation execution part 40 is configured to execute a cleaning operation of supplying a carrier fluid having a flow rate higher than a flow rate of a setting for the MFC 26 through the fluid supply flow path 36 at a timing between an end of analysis of a sample and a start of analysis of a subsequent sample. When the carrier fluid is supplied to the discharge flow path 28 through the fluid supply flow path 36 at a flow rate M2 higher than the flow rate M1 of the setting for the MFC 26, the carrier fluid flows backward opposite the MFC 26, i.e., toward the waste fluid chamber 22, at a flow rate (M2−M1) exceeding the set flow rate M1 of the MFC 26 to pressurize the inside of the waste fluid chamber 22. As a result, a flow of a carrier fluid from the waste fluid chamber 22 to the separation channel 2 through the separation membrane 10 is formed. The flow of a carrier fluid as described above separates sample particles adhering to the separation membrane 10 from the separation membrane 10 and discharges the sample particles to the outside of the separation channel 2 from the outlet port 6.

An end of analysis of a sample can, for example, be automatically recognized by the control device 38 in accordance with elapse of a preset time after the sample is injected by the sample injection part 12. The end of analysis of the sample may also be recognized by the control device 38 when a user inputs a command to end the analysis to the control device 38.

The cleaning-operation execution part 40 may be configured to execute the above-described cleaning operation only for a preset time, or until when no sample particle is substantially detected by monitoring a detection signal of the detector 20.

While the cleaning-operation execution part 40 may be configured to stop operation of the fluid feeding pump 14 during the above-described cleaning operation, the cleaning-operation execution part 40 may be configured in such a way that the fluid feed pump 14 supplies a carrier fluid into the separation channel 2 from the inlet port 4. When the fluid feed pump 14 supplies a carrier fluid from the inlet port 4 into the separation channel 2 during the cleaning operation, a flow of the carrier fluid from the inlet port 4 toward the outlet port 6 is formed in the separation channel 2. Then, a backward flow of the carrier fluid from the waste fluid chamber 22 into the separation channel 2 can efficiently guide sample particles separated from the separation membrane 10 into the outlet port 6. Even when the operation of the fluid feed pump 14 is stopped during the cleaning operation, the backward flow of the carrier fluid from a waste fluid chamber 22 side forms a flow allowing the carrier fluid in the separation channel 2 to be discharged from the outlet port 6. Thus, the sample particles remaining in the separation channel 2 can be discharged to the outside.

In addition, the control device 38 may have a function of supplying a carrier fluid to the discharge flow path 28 through the fluid supply flow path 36 during measurement for classification of sample particles. While the MFC 26 controls a flow rate of a cross flow during the measurement for classification of sample particles, a flow rate of a flow of a carrier fluid through the MFC 26 is a sum of a flow rate of the carrier fluid supplied to the discharge flow path 28 through the fluid supply flow path 36 and the flow rate of the cross flow. Thus, when the carrier fluid is supplied to the discharge flow path 28 through the fluid supply flow path 36 during the measurement for classification of sample particles, the flow rate of the carrier fluid flowing through the MFC 26 can be increased higher than the flow rate of the cross flow. This enables the flow rate of the cross flow to be accurately controlled even when the flow rate of the cross flow is set lower than a lower limit of the flow rate that can be controlled by the MFC 26.

Operation of the field-flow-fractionation apparatus of the present example will be described.

Sample particles are introduced into the separation channel 2 through the inlet port 4 together with a carrier fluid. At this time, the carrier fluid is also supplied from the intermediate port 8 into the separation channel 2 to form a focus flow. This focus flow causes the sample particles introduced from the inlet port 4 to be collected (focused) in a boundary portion between a flow of the carrier fluid from the inlet port 4 and a flow of the carrier fluid from the intermediate port 8. In the separation channel, a cross flow caused by a flow of the carrier fluid passing through the separation membrane 10 is also generated, and relaxation of the sample particles is performed in the boundary portion between the flow of the carrier fluid from the inlet port 4 and the flow of the carrier fluid from the intermediate port 8.

After the focusing and the relaxation are completed, supply of the carrier fluid from the fluid feed pump 16 into the separation channel 2 is stopped, and then no focus flow is formed. In the separation channel 2, a channel flow caused by the carrier fluid flowing from the inlet port 4 to the outlet port 6 and a cross flow caused by the carrier fluid passing through the separation membrane 10 are generated.

After the focusing and relaxation are completed, operation speed of the fluid feed pump 14 is controlled to cause a flow rate of fluid flowing through the detector 20 to be constant. A flow rate of the carrier fluid discharged from the discharge port 24, i.e., a flow rate of the cross flow, is not necessarily constant, and is adjusted as necessary. The flow rate of the cross flow is controlled by MFC 26 in such a way that when a flow rate of the carrier fluid flowing through the MFC 26 needs to be adjusted within a very low range of a flow rate such as 0.1 mL/min or less, the carrier fluid is supplied at a predetermined flow rate (e.g., 1 mL/min) through the fluid supply flow path 36 to prevent a flow rate of the carrier fluid flowing through the MFC 26 from decreasing to less than a lower limit of the flow rate that can be controlled by the MFC 26.

Sample particles collected at a predetermined position by the focusing and the relaxation flow toward the outlet port 6 while being influenced by the cross flow, and are introduced into the detector 20 in the order of smallness of the influence, and detected.

After the analysis of the sample is completed, a cleaning operation for removing the sample particles remaining in the separation chamber 2 is executed. During the cleaning operation, the carrier fluid is supplied to the discharge channel 28 through the fluid supply flow path 36 at a flow rate higher than the flow rate of the setting for the MFC 26.

The setting for the MFC 26 during the cleaning operation is not particularly limited, and may be zero. When a flow rate of the carrier fluid flowing through the discharge flow path 28 is caused to be zero, a backward flow from the waste fluid chamber 10 into the separation channel 2 is formed by a flow rate of the carrier fluid supplied through the fluid supply flow path 36. This reduces a flow rate of the carrier fluid necessary for forming the backward flow to enable consumption of the carrier fluid to be suppressed.

The fluid supply flow path 36 is not necessarily connected to the discharge flow path 28 as long as it is provided enabling the carrier fluid to be supplied to the waste fluid chamber 22 without passing through the separation channel 2.

Figure 2:
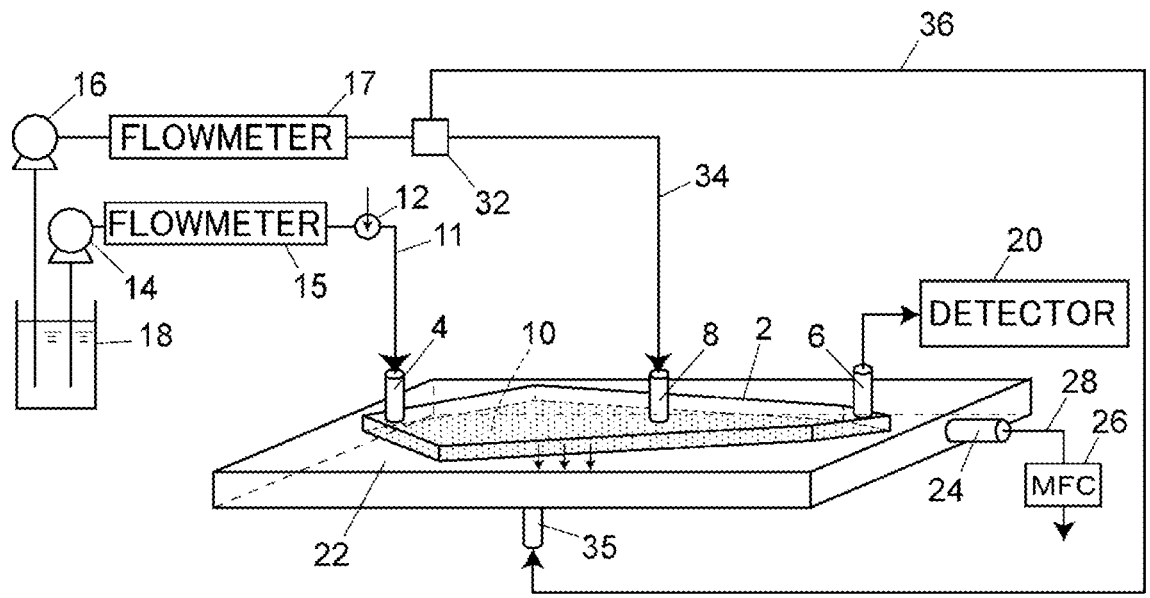
FIG. 2 is a schematic flow path configuration diagram illustrating a modified example of a field-flow-fractionation apparatus.

While FIG. 2 illustrates a modified example of the example of FIG. 1, the fluid supply flow path 36 is connected to an inlet port 35 on a waste fluid side provided in the waste fluid chamber 22 in this modified example. Even in a flow path configuration as described above, when the carrier fluid is supplied to the waste fluid chamber 22 at a flow rate higher than the flow rate of the setting for the MFC 26 through the fluid supply flow path 36, a backward flow from the waste fluid chamber 10 into the separation channel 2 is formed to enable the sample particles adhering to the separation membrane 10 to be separated from the separation membrane 10.

Figure 3:
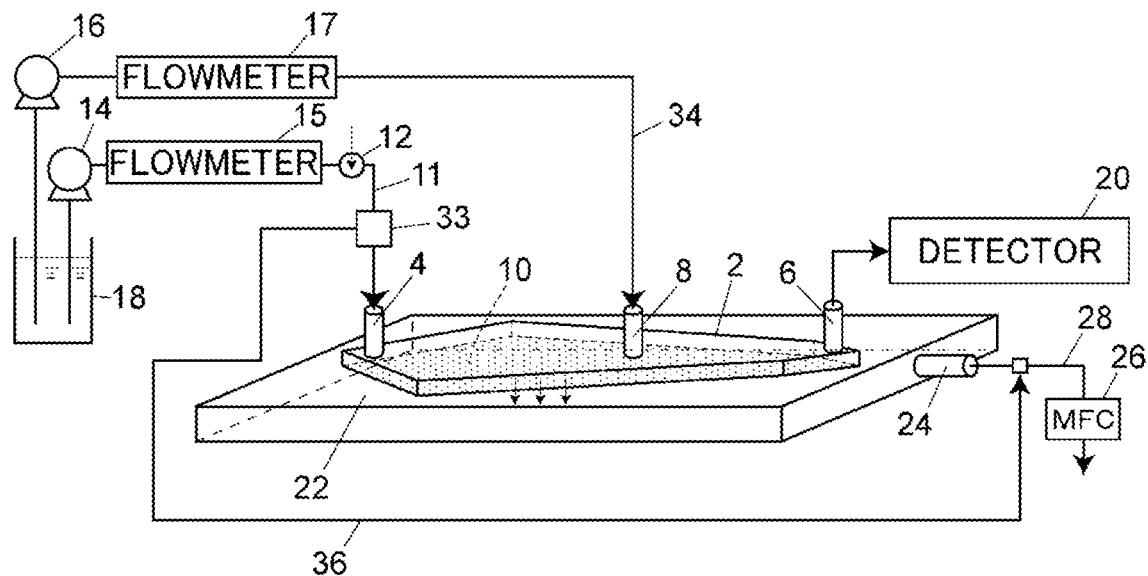
FIG. 3 is a schematic flow path configuration diagram schematically illustrating another modified example of a field-flow-fractionation apparatus.
Figure 4:
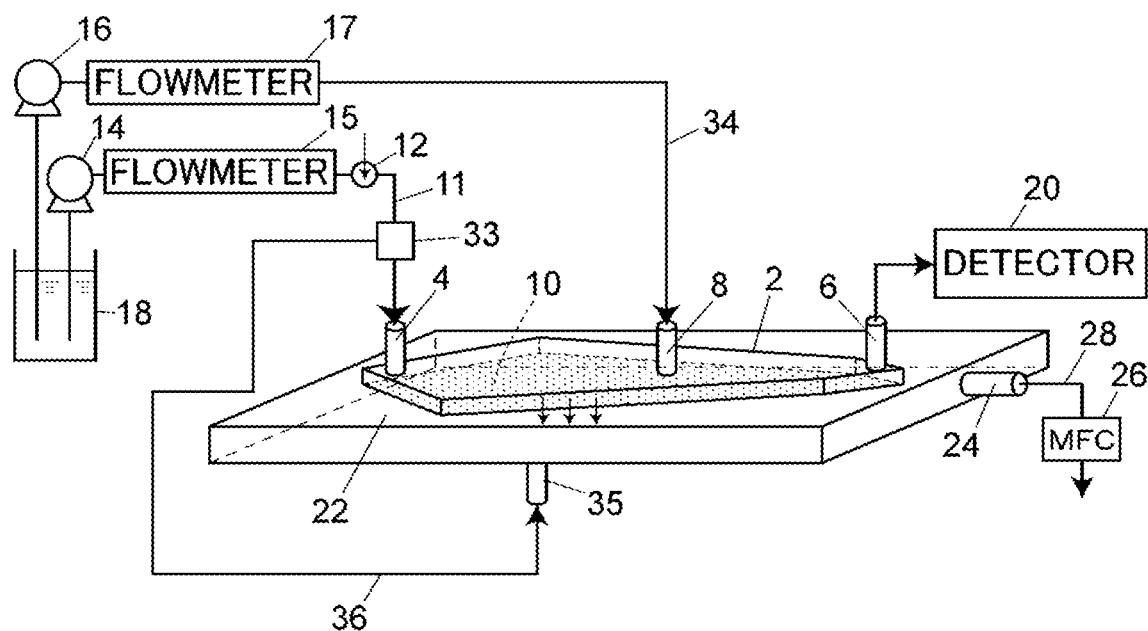
FIG. 4 is a schematic flow path configuration diagram schematically illustrating yet another modified example of a field-flow-fractionation apparatus.

While in the examples of FIGS. 1 and 2, the fluid supply flow path 36 is branched from the focus-flow fluid supply flow path 34, the present invention is not limited to this. As illustrated in FIGS. 3 and 4, the fluid supply flow path 36 may be branched from the inlet-port flow path 11. In an example of FIG. 3, the fluid supply flow path 36 is connected to the inlet-port flow path 11 through the switching valve 33, and a carrier fluid fed by the fluid feed pump 14 is to be supplied to the discharge flow path 28 through the fluid supply flow path 36. In an example of FIG. 4, the fluid supply flow path 36 is connected to the inlet-port flow path 11 through the switching valve 33, and a carrier fluid fed by the fluid feed pump 14 is to be supplied to the waste fluid chamber 22 through the fluid supply flow path 36.

Figure 5:
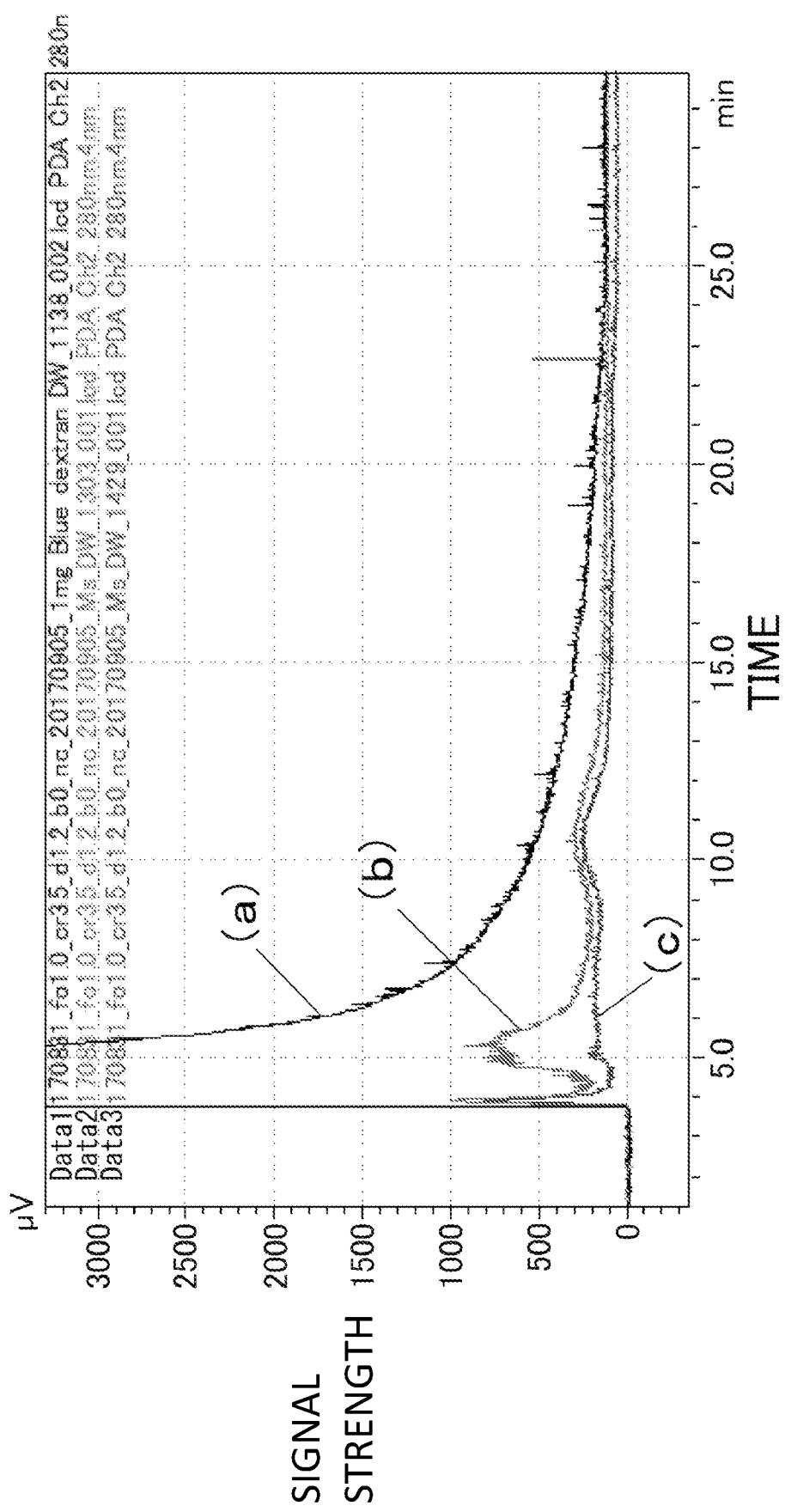
FIG. 5 is a fractogram showing verification results of effect of removing a residual sample by performing a cleaning operation.

FIG. 5 is a fractogram showing verification results of effects of removing a residual sample by performing a cleaning operation. In this verification experiment, the amount of blue dextran remaining in the separation chamber 2 was verified based on detection signals of the detector 20, using an apparatus having the configuration of FIG. 1.

This verification was performed as follows: water was used as a carrier fluid; the carrier fluid was first supplied from the inlet port 4 into the separation channel 2 at a flow rate of 0.035 mL/min and the carrier fluid was supplied from the intermediate port 8 into the separation channel 2 at a flow rate of 4.665 mL/min, and then processing was on standby; and after a baseline was stabilized, 100 µL of blue dextran having a concentration of 1 mg/mL was injected through the sample injection portion 12 to perform focusing for 3.5 minutes. After that, the fluid feed pump 16 was stopped, and the carrier fluid was supplied into the separation channel 2 from the inlet port 4 at a flow rate of 3.5 mL/min to set a flow rate of a cross flow to 2.3 mL/min (the flow rate of the setting for the MFC26 is set to 1.2 mL/min), and then elution for 26.5 minutes was performed. FIG. 5 shows the fractogram (a) at that time, and a peak of blue dextran was observed in five minutes after the elution was started.

After that, 50 µL of water was used as a sample, and analysis was performed under the same conditions as those of the above blue dextran. As a result, the fractogram (b) of FIG. 5 was obtained. In this fractogram, a peak of blue dextran was also observed in five minutes after the elution was started, and thus it can be seen that some blue dextran remained in the separation channel 2.

After that, cleaning operation for five minutes was performed in such a way that the carrier fluid was supplied to the discharge flow path 28 at a flow rate of 4.7 mL/min through the fluid supply flow path 36, and the flow rate of the setting for the MFC 26 was set to 3.5 mL/min to form a backward flow of 1.2 mL/min from the waste fluid chamber 22 into the separation channel 2. After that, the same analysis as the fractogram (b) in FIG. 5 was performed to result in obtaining fractogram (c) of FIG. 5. In this fractogram, a peak height of blue dextran is reduced to about ⅛ of the fractogram (b), and thus it can be seen that most of the blue dextran remaining in the separation channel 2 was removed by the cleaning operation.

DESCRIPTION OF REFERENCE SIGNS

2 Separation channel
4 Inlet port
6 Outlet port
8 Intermediate port
10 Separation membrane
11 Inlet-port flow path
12 Sample injection part
14, 16 Fluid feed pump
15, 17 Flowmeter
18 Container for carrier fluid 20 Detector
22 Waste fluid chamber
24 Discharge port
26 Mass flow controller
28 Discharge flow path
30 Carrier fluid adding part
32, 33 Switching valve
34 Focus-flow fluid supply flow path
35 Waste fluid side inlet port
36 Fluid supply flow path
38 Control device
40 Cleaning-operation execution part

What is claimed is:

1. A cleaning method in a separation channel provided in a field-flow-fractionation apparatus,
the field-flow-fractionation apparatus including: a separation channel having one end provided with an inlet port and another end provided with an outlet port, and forming a space through which a carrier fluid flows; a separation membrane forming a wall surface defining the separation channel; a waste fluid chamber which forms a space through which the carrier fluid having passed through the separation membrane flows and has a discharge port through which the carrier fluid is discharged to the outside; and a flow rate adjusting part connected to the discharge port to adjust a flow rate of the carrier fluid to be discharged from the waste fluid chamber through the discharge port to a flow rate of a setting for the flow rate adjusting part,
the cleaning method comprising:
a cleaning step of, after an analysis of a sample is completed, supplying a carrier fluid to a portion between the waste fluid chamber and the flow rate adjusting part at a flow rate higher than the flow rate of the setting of the flow rate adjusting part without directly supplying the carrier fluid to the separation channel, wherein
in the cleaning step, a flow of a carrier fluid from the waste fluid chamber to the separation channel is formed and the carrier fluid which has flowed into the separation channel from the waste fluid chamber is discharged from the separation channel through the outlet port.

2. The cleaning method according to claim 1, wherein the setting for the flow rate adjusting part is set to zero in the cleaning step.

3. The cleaning method according to claim 1, wherein the cleaning step is performed in a state where a carrier fluid separate from the carrier fluid supplied to the portion between the waste fluid chamber and the flow rate adjusting part flows into and through the separation channel.

4. The cleaning method according to claim 1, wherein the carrier fluid supplied to the portion between the waste fluid chamber and the flow rate adjusting part during the cleaning step enters the separation channel through the separation membrane.

5. A field-flow-fractionation apparatus comprising:
a separation channel having one end provided with an inlet port and the other end provided with an outlet port, and forming a space through which a carrier fluid supplied through the inlet port flows;
a separation membrane forming a wall surface defining the separation channel;
a waste fluid chamber forming a space through which the carrier fluid having passed through the separation membrane flows, and having a discharge port through which the carrier fluid having passed through the separation membrane is discharged to the outside;
a flow rate adjusting part connected to the discharge port to adjust a flow rate of the carrier fluid to be discharged from the waste fluid chamber through the discharge port to a flow rate of a setting for the flow rate adjusting part;
a fluid supply flow path connected to a portion between the waste fluid chamber and the flow rate adjusting part to supply a carrier fluid to the waste fluid chamber without first going through the separation channel;
a fluid supply part that supplies a carrier fluid to the waste fluid chamber through the fluid supply flow path; and
a control part configured to control the fluid supply part and the flow rate adjusting part to cause the field-flow-fractionation apparatus to perform a cleaning operation, wherein
the control part is configured, in the cleaning operation, to control the fluid supply part and the flow rate adjusting part to supply the carrier fluid to the waste fluid chamber through the fluid supply flow path at a flow rate higher than the flow rate of the setting for the flow rate adjusting part so that a flow of the carrier fluid from the waste fluid chamber to the separation channel is formed until analysis of a subsequent sample is started after analysis of a sample is completed, and wherein
the field-flow-fractionation apparatus is configured, in the cleaning operation, to cause the fluid which has flowed into the separation channel from the waste fluid chamber to be discharged from the separation channel through the outlet port.

6. The field-flow-fractionation apparatus according to claim 5, wherein
the control part is configured to set the setting for the flow rate adjusting part to zero during the cleaning operation.

7. The field-flow-fractionation apparatus according to claim 5, wherein
the control part is configured to perform the cleaning operation in a state where a carrier fluid is supplied into the separation channel through the inlet port.

8. The field-flow-fractionation apparatus according to claim 5, further comprising:
a focus-flow fluid supply flow path connected to the separation channel at a carrier fluid supply position different from the inlet port to supply a carrier fluid to the separation channel so that a flow of a carrier fluid opposite to a flow of a carrier fluid from the inlet port is formed,
wherein the fluid supply part includes a fluid supply pump which supplies the carrier fluid and is connected, via a switching valve, to the focus-flow fluid supply flow path and the fluid supply flow path, and the fluid supply part is configured to select either the focus-flow fluid supply flow path or the fluid supply flow path as a channel for supplying the carrier fluid by switching the switching valve.

9. The field-flow-fractionation apparatus according to claim 5, wherein
the fluid supply part includes a fluid supply pump which supplies the carrier fluid and is connected, via a switching valve, to an inlet flow path and the fluid supply flow path, the inlet flow path leads to the inlet port of the separation channel, the fluid supply part is configured to select either the inlet flow path or the fluid supply flow path as a channel for supplying the carrier fluid by switching the switching valve.

10. A cleaning method in a separation channel provided in a field-flow-fractionation apparatus, the field-flow-fractionation apparatus including: a separation channel forming a space through which a carrier fluid flows; a separation membrane forming a wall surface defining the separation channel; a waste fluid chamber which forms a space through which the carrier fluid having passed through the separation membrane flows and has a discharge port through which the carrier fluid is discharged to the outside; and a flow rate adjusting part connected to the discharge port to adjust a flow rate of the carrier fluid to be discharged from the waste fluid chamber through the discharge port to a flow rate of a setting for the flow rate adjusting part, the cleaning method comprising:

a cleaning step of, after an analysis of a sample is completed, supplying a cleaning fluid to a first portion between the waste fluid chamber and the flow rate adjusting part at a flow rate higher than the flow rate of the setting of the flow rate adjusting part without directly supplying the cleaning fluid to the separation channel, so that the cleaning fluid flows from the first portion into the waste fluid chamber.

11. The cleaning method according to claim 10, wherein the cleaning fluid enters the waste fluid chamber, and subsequently enters the separation channel.

12. The cleaning method according to claim 11, wherein the cleaning fluid supplied enters the separation channel through the separation membrane.

13. The cleaning method according to claim 12, wherein the cleaning step is performed in a state where a carrier fluid separate from the cleaning fluid flows into and through the separation channel.

* * * * *